March 11, 1952  R. RUEGG  2,588,769
INSTRUMENT FOR MEASURING HEAT QUANTITIES
Filed Aug. 1, 1949

Inventor
Rudolf Ruegg
By Dodge and Sons
Attorneys

Patented Mar. 11, 1952

2,588,769

UNITED STATES PATENT OFFICE 2,588,769

INSTRUMENT FOR MEASURING HEAT QUANTITIES

Rudolf Ruegg, Zurich, Switzerland

Application August 1, 1949, Serial No. 107,839
In Switzerland August 6, 1948

7 Claims. (Cl. 73—193)

This invention relates to an instrument for measuring heat quantities, which is suitable especially for allotting heating charges in centrally heated houses occupied by a number of families, and by means of which the total amount of heat consumed may be allotted to the individual tenants in accordance with the actual consumption.

It has already been proposed for this purpose to connect to each central heating element (radiator) a measuring instrument comprising a cylindrical vessel filled with an evaporating liquid, the heat given off by each radiator being determined from the fall in the liquid level which takes place during a heating period.

The object of the invention is to avoid the use of a liquid. To this end, in a heat-quantities measuring instrument according to the invention, the deformation of an element consisting of a material which has between about 20° and 100° C. creeping properties dependent upon temperature, time and stress (caused by a load), is employed as a measurement of the heat quantity given off. The deformable element may be stressed in various ways, but it is preferred to construct it as a cantilever which bends at elevated temperatures under a definite force reaction. This reaction may be developed by the weight of the element itself either alone or assisted by other means such as a supported weight. If the deformable element is fashioned as a bar, it may be of round or rectangular section. The arrangement may be such that the stress conditions vary during the course of the deformation. The deformable element preferably consists of zinc or of a zinc alloy.

Two embodiments of the subject of the invention are illustrated by way of example in the accompanying drawing, in which.

Figure 1:
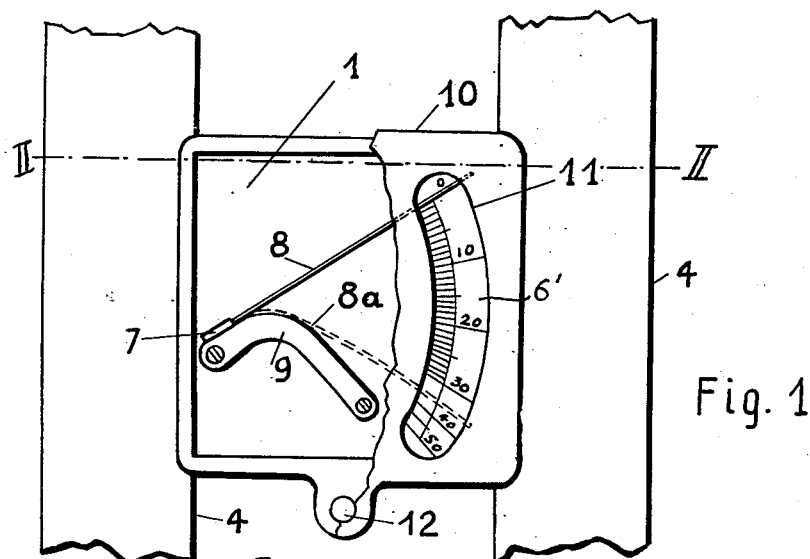
Figure 1 is an elevational view of a first embodiment.
Figure 2:
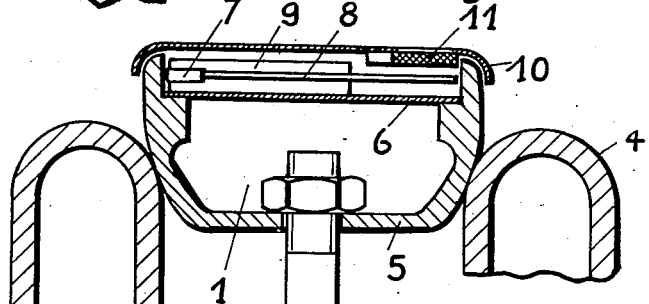
Figure 2 is a horizontal section on the line II—II of Figure 1.

In Figures 1 and 2, 1 is an instrument for measuring heat quantities, which is secured to a central heating element 4 by means of a screw bolt 2 and a bracket 3. The said heat-quantities measuring instrument 1, comprises a casing 5, and a plate 6 secured thereto and provided with a scale 6'. Secured to the said plate 6 is a socket 7 serving to receive a deformable element 8. The said deformable element has the form of a bar subjected to deflection under its own weight, the said bar consisting of a material which has, between about 20° and about 100° C., creeping properties dependent upon temperature, load and time. One typical position of the bar 8 after such deflection is indicated in broken lines at 8a. In the course of its deflection, the bar 8 is gradually brought to bear against a curved support 9, whereby the stress conditions are varied. The scale 6' on the plate 6 may be graduated in accordance with the curvature of the support 9, and this curvature can be so designed that the maximum deflection of the bar 8 can be prevented from exceeding a predetermined amount.

The instrument 1 is enclosed by a cover 10 in which a glass 11 is provided above the scale 6' on the plate 6. The cover 10 can be readily opened for the purpose of replacing the deformable bar 8. A bore 12 through casing 5 and cover 10 is formed for the provision of a seal (not shown) to prevent unauthorized adjustment of the deformable bar 8.

The described instrument for measuring heat quantities operates in the following manner: The creeping characteristics of the material used for the bar 8 are such that creep and resulting deflection start at about 25° C. This can be controlled by selection of the alloy of which the bar is composed. If the temperature of the radiator rises during operation, the bar 8 is deflected to an amount increasing with the temperature and with the length of time during which the temperature is effective. During the deformation, the stress conditions are varied in the sense of a diminishing deflection of the bar 8, other conditions remaining equal as regards temperature and time. Therefore, if the heat-measuring instrument 1 is suitably dimensioned the total deflection of the bar 8 is a measurement of the total amount of heat given off per square metre of radiator surface. This deflection is a substantially accurate measurement of the total amount of heat given off. The operation of the described instrument for measuring heat quantities is not affected by any influence such as is exerted, for example, by air pressure and air moisture on the rate of evaporation of a liquid. The deflection of the pointer (deformable bar) is dependent exclusively upon temperature and upon the time during which the temperature is effective.

In heat-quantities measuring instruments of the described type, the distribution of stress in the deformable body if it is fashioned, for example, as a bar subjected to bending stress, undergoes a variation in the course of time. Accordingly, there may be provided in association with the deformable element a device by means of which the said element may be initially stressed when fitted. Thus, at the commencement of the measurement there is a distribution of stress in the deformable element such as would otherwise only arise after a certain time. If a bar subjected to bending stress is fitted without initial stress, the initial deflection is relatively great, and this would necessitate the use of a non-linear scale.

If the deformable bar is subjected to bending stress it can conveniently be made short in relation to the length of a pointer mounted thereon, so that the tip of the pointer moves with close approximation along a circle. The further advantage is then obtained that the graduations of the scale can be laid out as radii of this circle.

Both the aforesaid improvements enable a simplified form of scale to be employed. Furthermore, owing to the fact that the deformable bar is initially stressed no initial reading can be produced at room temperature and when the heat consumer is not heated.

Figure 3:
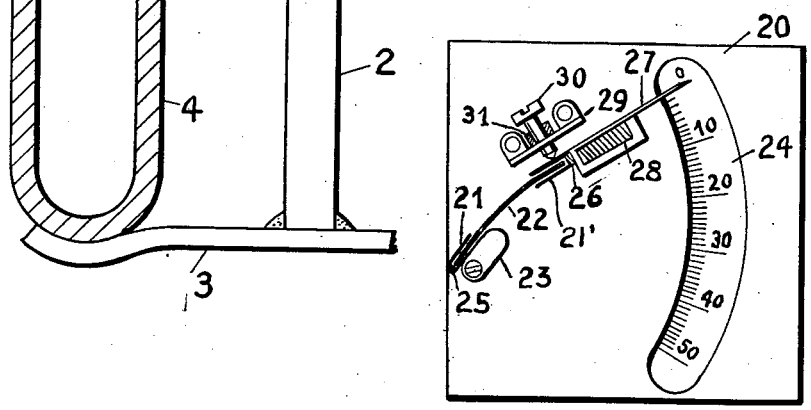
Figure 3 is an elevational view of a second embodiment.

Figure 3 shows a preferred embodiment of the last-mentioned type. In this figure, 20 is the casing of the heat-quantities measuring instrument to which on the one hand a scale 24 and on the other hand a holder 23 comprising a socket 21 are secured. The socket 21 serves to receive and confine one end of a deformable member 22 of standard length and composition. The other end of member 22 fits a socket 21 which carries pointer 27 and a weight 28. The ends of the member 22 seat against the bottoms 25 and 26 of the sockets 21 and 21'. As a consequence that part of member 22 between the sockets 21 and 21' which is subjected to bending stress is standardized as to length, so that accuracy is assured. Also secured to the casing 20 is a holder 29 provided with an adjusting screw 30 with a lock nut 31. By means of this arrangement, it is possible to fit the deformable element 22 in the instrument in an appropriately stressed condition at the time of assembly. In this way it is possible to zero the instrument.

Heat-quantities measuring instruments of the type described can be employed not only to allot the heat consumed in individual buildings between the various tenants in accordance with the actual consumption, but also to allot the heat consumed in remote-heating installations to individual buildings or even to whole groups of houses, in which case the heat-quantities measuring instruments would have to be connected to the return pipes of the individual buildings.

What is claimed is:

1. An instrument of the character described, comprising in combination a support; a holder carried thereby; an element fixed at one end to said holder and so positioned thereby as to be subject to a flexing tendency developed by gravity, said element being composed of a material which between approximate temperature limits of 25° C. and 100° C. develops a creep flexure which is a direct function of three independent quantities, namely, temperature, time and the intensity of said flexing tendency; and a graduated scale against which the flexure of said member may be read, said scale being mounted on said support.

2. The combination defined in claim 1 in which the element is in the form of a bar stressed by its own weight.

3. The combination with the structure defined in claim 1 and in which the element is in the form of a bar, of loading means reacting at the end of said bar to increase said flexing tendency.

4. The combination defined in claim 1 in which the element is zinc.

5. The combination defined in claim 1 in which the element is an alloy of zinc.

6. The combination with the structure defined in claim 1 of means progressively engaged by said element as the latter flexes, whereby a progressively increasing part of the flexing tendency is neutralized as flexure progresses.

7. The combination with the structure defined in claim 1 of means for initially stressing said element in the direction of the flexing tendency developed by gravity.

RUDOLF RUEGG.

No references cited.